US007609415B2

(12) United States Patent
Miki et al.

(10) Patent No.: US 7,609,415 B2
(45) Date of Patent: Oct. 27, 2009

(54) SYSTEM AND METHOD FOR DIGITAL IMAGE IDENTIFICATION AND DISTRIBUTION (75) Inventors: Manabu Miki, Osaka (JP); Junichiro Nishi, Osaka (JP)

(73) Assignee: Viva Computer Co., Ltd, Osaka (JP)

( * ) Notice: Subject to any disclaimer, the term of this patent is extended or adjusted under 35 U.S.C. 154(b) by 688 days.

(21) Appl. No.: 11/354,962

(22) Filed: Feb. 16, 2006

(65) Prior Publication Data

US 2006/0285169 A1 Dec. 21, 2006

(30) Foreign Application Priority Data

Jun. 17, 2005 (JP) ............... 2005-177632

(51) Int. Cl.
*H04N 1/40* (2006.01)
(52) U.S. Cl. ................... 358/3.28; 358/1.1; 358/1.15
(58) Field of Classification Search ................ 358/1.1, 358/1.9, 3.28, 1.15, 1.18, 450, 540
See application file for complete search history.

(56) References Cited

U.S. PATENT DOCUMENTS

| 5,606,431 | A | * | 2/1997 | Park | ............... | 358/503 |
| 6,724,921 | B2 | * | 4/2004 | Yamaguchi | ............. | 382/118 |
| 7,099,050 | B2 | * | 8/2006 | Motoyama | ............. | 358/468 |
| 7,221,800 | B2 | * | 5/2007 | Sesek et al. | ............. | 382/229 |
| 2004/0008377 | A1 | * | 1/2004 | Cheng et al. | ............ | 358/1.18 |

FOREIGN PATENT DOCUMENTS

JP 11-41453 A 2/1999

* cited by examiner

*Primary Examiner*—Thomas D Lee
(74) *Attorney, Agent, or Firm*—Sughrue Mion, PLLC

(57) ABSTRACT

Digital image create equipment is provided for insetting identified original information into an original to create a digital image, including identified original information insetting position moving unit for moving the identified original information from a reference position to a position different from the reference position according to a rule to inset the identified original information every time the digital image is created. According to the digital image create equipment, the image information on the original is faithfully reproduced, and the digital image that is excellent in the robustness of identified original information with respect to the unauthorized copying or falsification can be created, as compared with the related art digital watermark insetting equipment.

14 Claims, 10 Drawing Sheets

Fig. 6 a) ANGLE AND VERSION ASSOCIATED TABLE (UNIT: DEGREE)

| ORIGINAL DATA TITLE | FIRST VERSION | SECOND VERSION | THIRD VERSION | | N-TH VERSION |
|---|---|---|---|---|---|
| STAR | 1 | 2 | 3 | | n |
| MOMENTARY FOREVER | -1 | -2 | -3 | | -n |
| | | | | | | b) POSITION AND THE-NUMBER-OF-COPIES ASSOCIATED TABLE (UNIT: PIXEL)

| ORIGINAL DATA TITLE | FIRST COPY | SECOND COPY | THIRD COPY | | N-TH COPY |
|---|---|---|---|---|---|
| STAR | 1 | 2 | 3 | | n |
| MOMENTARY FOREVER | 2 | 5 | 7 | | N |
| | | | | | |

ORIGINAL DATA TITLE: STAR

| THE NUMBER OF COPIES | FIRST COPY | SECOND COPY | THIRD COPY | | N-TH COPY |
|---|---|---|---|---|---|
| FIRST VERSION | x-AXIS: 1px<br>y-AXIS: 0px<br>ANGLE: 0 DEGREE<br>USER A | x-AXIS: 2px<br>y-AXIS: 0px<br>ANGLE: 0 DEGREE<br>USER B | x-AXIS: 3px<br>y-AXIS: 0px<br>ANGLE: 0 DEGREE<br>USER C | | x-AXIS: Mpx<br>y-AXIS: 0px<br>ANGLE: 0 DEGREE<br>USER N |
| SECOND VERSION | x-AXIS: 1px<br>y-AXIS: 1px<br>ANGLE: 1 DEGREE<br>USER AA | x-AXIS: 2px<br>y-AXIS: 1px<br>ANGLE: 1 DEGREE<br>USER BB | x-AXIS: 3px<br>y-AXIS: 1px<br>ANGLE: 1 DEGREE<br>USER CC | | x-AXIS: Mpx<br>y-AXIS: 1px<br>ANGLE: 1 DEGREE<br>USER DD |

Fig. 10

SYSTEM AND METHOD FOR DIGITAL IMAGE IDENTIFICATION AND DISTRIBUTION

CROSS REFERENCE TO RELATED APPLICATIONS

This application claims foreign priority based on Japanese Patent Application No. JP-2005-177632, which was filed on Jun. 17, 2005 in the Japanese Patent Office, the disclosure of which is incorporated herein by reference in its entirety. This priority claim is being submitted concurrently with the filing of this application.

BACKGROUND OF THE INVENTION

1. Technical Field

Aspects of the present invention relate to a digital image create equipment for creating a digital image by digitalizing an original into a digital image, and more particularly to a digital image create equipment for insetting identified original information that identifies an original and identified user information that identifies a user of a digital image to be distributed or delivered into the original to create the digital image.

2. Related Art

With related art developments in computer technology and digital image technology, a digital image such as a photograph, a picture, a design drawing, an illustration can be readily copied using a personal computer at home. In view of the above, copyright protection for the digital image is an important social issue. To prevent the unauthorized copying or falsification of the digital image, there has been proposed various related art equipment for insetting copyright protection information (hereinafter referred to as "identified information" unless otherwise specified), such as identified original information or identified user information into an original, to create a digital image.

As related art identified information insetting equipment, a related art digital watermark insetting equipment is disclosed in JP 11-41453 A. In this related art insetting equipment, the image of identified information is made of microscopic pixels that cannot be sensed by human eyes, and is inset in the image of an original. As a method of forming the digital watermark image, a related art method of processing image data of the original is known, as will be described later.

(a) A method of producing a digital watermark image by processing color separation image data of yellow that is lowest in resolution of human eyes among three color resolution images (yellow, magenta, cyan) of an original.

(b) A method of producing a digital watermark image by processing luminance data of an original.

Also, to extract the digital watermark image, a special image processing device is required, having a high-precision image analyzing function.

However, the digital image created by the related art digital watermark insetting equipment leads to a problem in that the image information of the original cannot be faithfully reproduced, because the image information on a portion into which the watermark image has been inset is not processed. If the digital image is output by a printer or copied in a low-resolution format, another problem is that the watermark image cannot be reproduced due to the shortness of the resolution of an output printer, or the shortness of recording resolution of an electronic data recording device, so as to lose the identified information.

SUMMARY OF THE INVENTION

The present invention provides digital image create equipment that achieves the faithful reproducibility of an original and the robustness of identified information with respect to the unauthorized copying or falsification. Also, the present invention provides a recording medium that is recorded with a digital image created by the digital image create equipment. Further, the present invention provides digital image send equipment and digital image receive equipment for sending or receiving a digital image that is created by the digital image create equipment, and a digital image distribute-receive system for distributing and receiving a digital image.

Digital image create equipment is provided for insetting identified original information that identifies an original into the original to create a digital image, the digital image create equipment including at least one of identified original information insetting position moving means for moving the identified original information from a reference position to a different position according to a predetermined rule in parallel to inset the identified original information, and identified original information inset angle moving means for moving the identified original information from a reference angle to a different angle according to a predetermined rule to inset the identified original information. With the above structure, even in the case where the distributed or delivered digital image is outputted by a printing apparatus or a printer, or even in the case where the digital image is copied in a low-resolution format, it is hard to lose the identified information on an author or a user. As a result, there is obtained an advantage of improving the robustness of identified information with respect to the unauthorized copying or falsification.

The identified image information that identifies the digital image is associated with an identified original information insetting position, or the identified image information is associated with the identified original information insetting angle. The above structure produces an effect in that it is possible to easily identify the identified image information such as a user or purchaser of the digital image without using a specific image processing device.

The identified original information includes any one of a signature that is handwritten by an author of the original and a signature that is handwritten by an owner of the original. The above structure produces an effect in that the identified original information can be readily visually extracted by simple means for displaying the identified original information on a display device.

The identified original information is inset in a portion outside an image area of the digital image. The above structure produces an effect in that the image information on the entire area of the original can be faithfully reproduced.

There is provided a digital image recording medium in which the digital image that has been created by the digital image create equipment of the present invention is recorded in an electronic data recording medium. The above structure produces an effect in that because the purchaser or the user of the digital image recording medium can be reliably identified, it is possible to protect the copyright of the author or owner of the digital image.

A digital image distribute-receive system is made up of the digital image create equipment, the digital image send equipment, and the digital image receive equipment of the present invention. The above structure produces an effect in that because the user to which the digital image is distributed can be reliably identified, it is possible to protect the copyright of the author or owner of the digital image.

The image information on the original is faithfully reproduced, and the digital image that is excellent in the robustness of identified original information with respect to the unauthorized copying or falsification can be created as compared with the related art digital watermark insetting equipment. Also, according to the digital image recording medium, because the purchaser or the user of the digital image recording medium can be reliably identified, it is possible to protect the copyright of the author or owner of the digital image. Also, according to the digital image distribute-receive system, because the user to which the digital image is distributed can be reliably identified, it is possible to protect the copyright of the author or owner of the digital image.

BRIEF DESCRIPTION OF THE DRAWINGS

The above and/or other aspects of the present invention will be more apparent by describing exemplary embodiments of the present invention with reference to the accompanying drawings, in which.

DETAILED DESCRIPTION OF THE EXEMPLARY EMBODIMENTS

Now, a description will be given in more detail of exemplary embodiments of the present invention with reference to the accompanying drawings.

First Exemplary Embodiment

Figure 1:
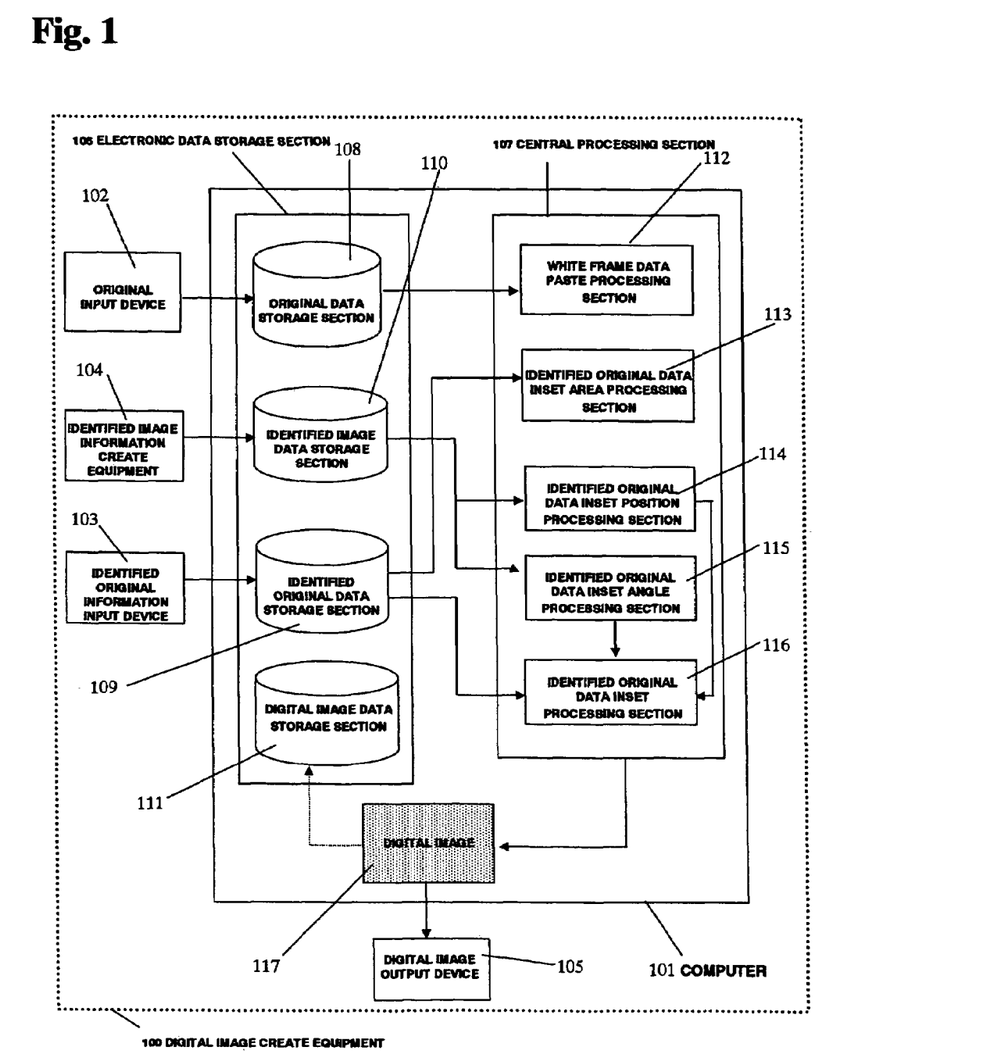
FIG. 1 is a block diagram showing one structural example of a digital image create equipment according to an exemplary embodiment.

FIG. 1 is a block diagram showing a main portion of one structural example of digital image create equipment according to an exemplary embodiment.

Digital image create equipment 100 includes a computer 101 and peripheral devices including an original input device 102, an identified original information input device 103, an identified image information create device 104, and a digital image output device 105.

The computer 101 includes an electronic data storage section 106 that stores electronic data therein, a central processing section 107 that arithmetically processes the electronic data, and an input section such as a keyboard (not shown).

The electronic data storage section 106 includes an original data storage section 108 that stores the original data outputted from the original input device 102, an identified original data storage section 109 that stores the identified original data outputted from the identified original information input device 103, an identified image data storage section 110 that stores the identified image data outputted from the identified image information create device 104, and a digital image data storage section 111 that stores digital image data where the identified original data is inset in the original data.

The central processing section 107 includes a white frame data paste processing section 112 that pastes a white frame in the periphery of the original data, an identified original data inset area processing section 113 for obtaining an area where the identified original data is inset from the original data, and an identified original data insetting position processing section 114 that calculates the insetting position of the identified original data based on the identified image data read from the identified image data storage section 110 in response to an identified image data read signal.

The central processing section 107 further includes an identified original data insetting angle processing section 115 that calculates the insetting angle of the identified original data based on the identified image data read from the identified image data storage section 110 in response to the identified image data read signal, and an identified original data inset processing section 116 that moves the identified original data to a position or an angle based on the calculation result of the identified original data insetting position processing section 114, or the identified original data insetting angle processing section 115 to inset the original data.

The original input device 102 includes a digital image input device, such as a digital camera or a digital scanner, but not limited thereto. The identified original information input device 103 includes a digital scanner, a pentop input device, or a word processor, but is not limited thereto. The identified original information includes a seal, a portrait, or a handwritten signature of an author, copyright holder, or ownership of the original, or the original title, but is not limited thereto. Among the foregoing identified information, in the handwritten signature the amount of information is small, and the identified original information can be visually discriminated with ease.

The identified image information create equipment 104 is a second computer. The identified image information may be created by the computer 101. The identified image information includes the version number and print order given in copying the same digital image, the serial number given to the creating order of the digital image (including a different image), the identified user information that uses or purchases the digital image, or retrieval information for reading a desired digital image from the digital image data storage section 111.

The digital image output device 105 includes an electronic data recording device for recording and storing digital image data in an electronic data recording medium such as an optical disk, a magnetic disk, a magnetic tape, or a semiconductor memory, an image send device that sends the digital image data by a communication unit, a display device that converts the digital image data into an image signal to display the image on a CRT, liquid crystal, or PDP (or the like, but not limited thereto), and a digital printing device that converts the digital image data into a print signal to print the data on receiver paper.

Also, the identified user data storage section that stores the identified user information on the user or purchaser of the digital image therein may be disposed in the electronic data storage section 106. In addition, a distribution data creating section that creates distribution data which associates the identified user data with the identified image data may be disposed in the central processing section 107, and a distribution data storage section that stores a distribution data table created in the distribution data creating section may be disposed in the electronic data storage section 106.

Figure 2:
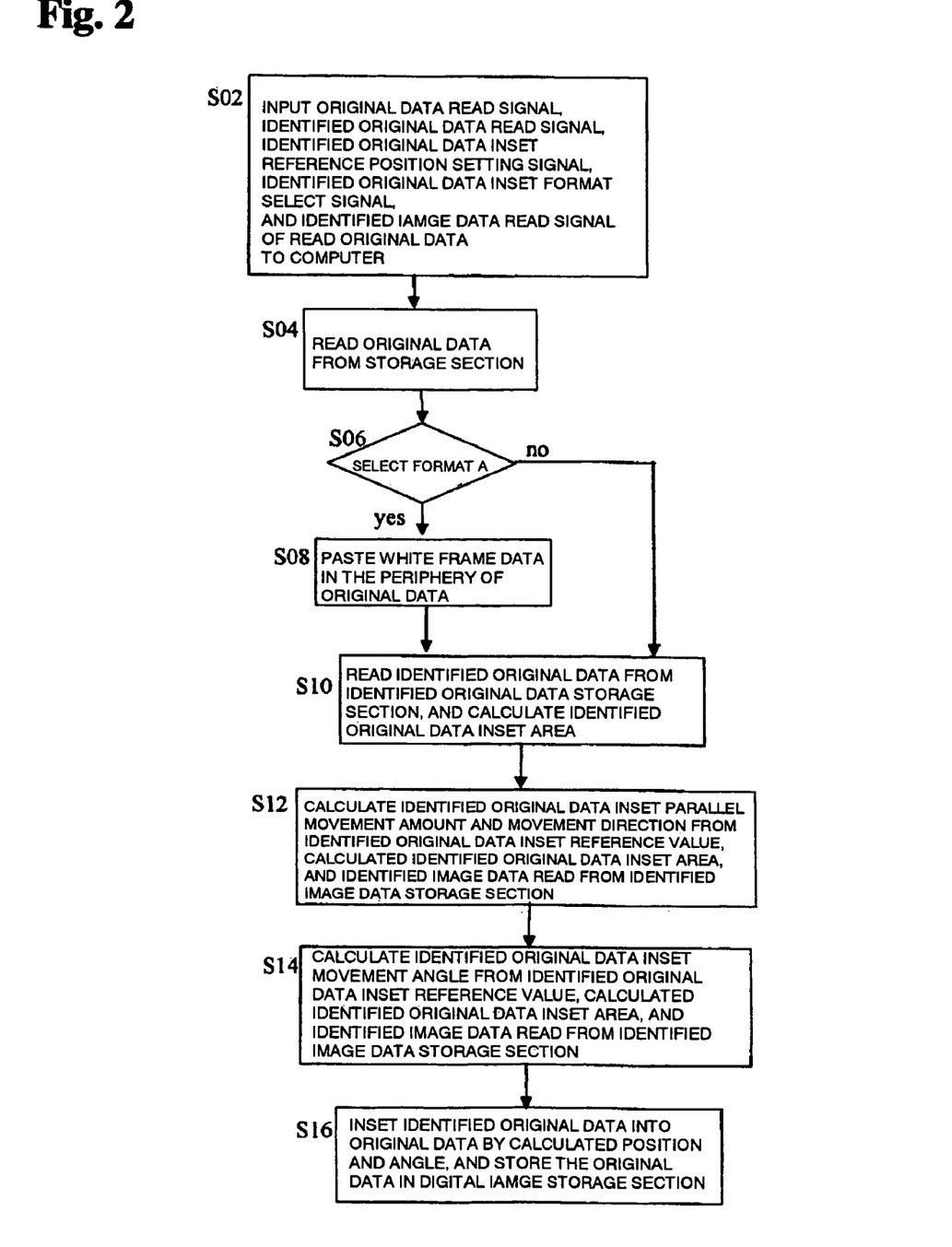
FIG. 2 is a flowchart showing a flow of an identified original data insetting arithmetic processing according to an exemplary embodiment.

FIG. 2 is a flowchart showing a flow of an identified original data insetting arithmetic process. Referring to FIG. 2, a method of insetting the identified original data into the original data will be described below.

(Step S02)

An original data read signal, an identified original data inset format select signal, an identified original data read signal, an identified original data inset reference position setting signal, and an identified image data read signal are input to the computer 101 from the input unit. The arithmetic processing based on those input signals is controlled by a computer program (e.g., a set of instructions in a computer-readable medium).

(Step S04)

Desired original data is read from the original data storage section 108 based on the original read signal, and is then inputted to the central processing section 107.

(Step S06)

Figure 3:
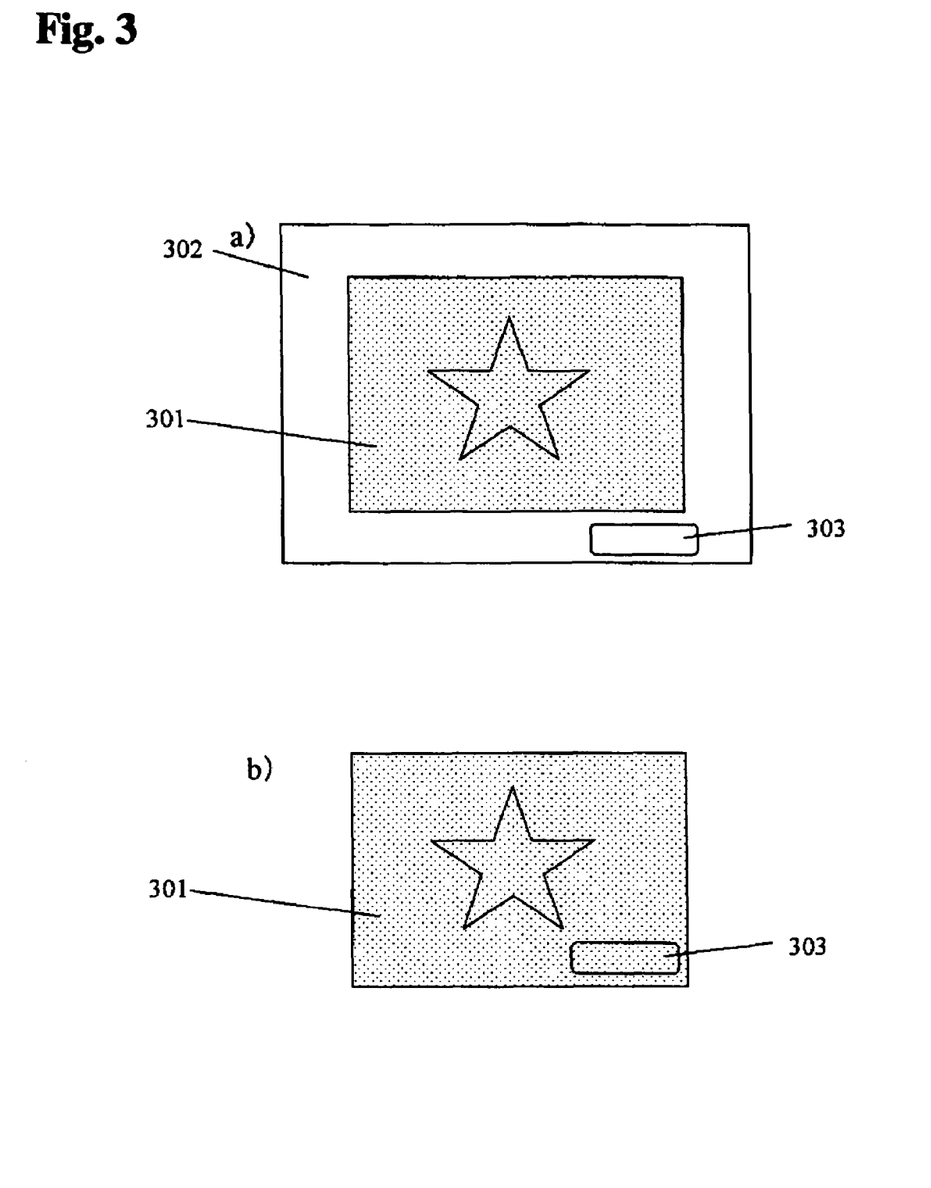
FIGS. 3A and 3B are conceptual diagrams showing a digital image according to an exemplary embodiment.

The arithmetic processing of any one of formats A and B as shown in FIG. 3 is conducted in the central processing section 107 based on an identified original data insetting format select signal.

In format A, as shown in FIG. 3A, a white frame 302 is formed out of an image area of the original 301, and identified original information 303 is inset in the white frame 302. In format B, as shown in FIG. 3B, the identified original information 303 is inset within the image area of the original 301. The selection of format A or format B is determined by appropriate selection according to a request from the author or user. Format A is suitable to the original such as great pictures or artistic photographs, and the image information on the entire area of the original can be reproduced.

While the foregoing formats are disclosed, the present invention is not limited thereto, and other formats as would be understood by one of ordinary skill in the art may also be included without departing from the scope of the invention.

(Step S08)

If a select signal of the format A is inputted, the white frame data is pasted in the periphery of the original data by the white frame data paste processing section 112.

(Step S10)

The identified original data is read from the identified original data storage section 110 on the basis of the identified original data read signal, and then inputted to the identified original data inset area processing section 113. Then, the identified original data inset area is calculated based on the size and configuration of the inputted identified original data.

(Step S12)

The original data of the format A with a white frame or the original data of the format B with no white frame is input to the identified original data insetting position processing section 114. Then, the parallel movement amount and the movement direction of the identified original insetting area pasted to the white frame data of the format A or the original data of the format B is calculated from the identified original data insetting area that is outputted from the identified original data insetting area processing section 113, a reference position that is set based on the identified original data insetting reference position setting signal, and the identified image data read from the identified image data storage section 110 in response to the identified image data read signal.

(Step S14)

Alternatively, the original data of the format A with a white frame or the original data of the format B with no white frame is input to the identified original data insetting angle processing section 115. Then, the movement angle of the identified original data insetting area which is pasted to the white frame data of the format A or the original data of the format B is calculated from the identified original data insetting area, the reference position that is set on the basis of the identified original data insetting reference position setting signal, and the identified image data that is read from the identified image data storage section 110 in response to the identified image data read signal.

(Step S16)

The identified original data, the output data from the identified original data insetting position processing section 114, and the output data from the identified original data insetting angle processing section 115 are input to the identified original data insetting processing section 116, and the identified original data is inset in the identified original data insetting area. The digital image 117 into which the identified original data is inset is stored in the digital image storage section 111, and then supplied at a succeeding copying time.

Figure 4:
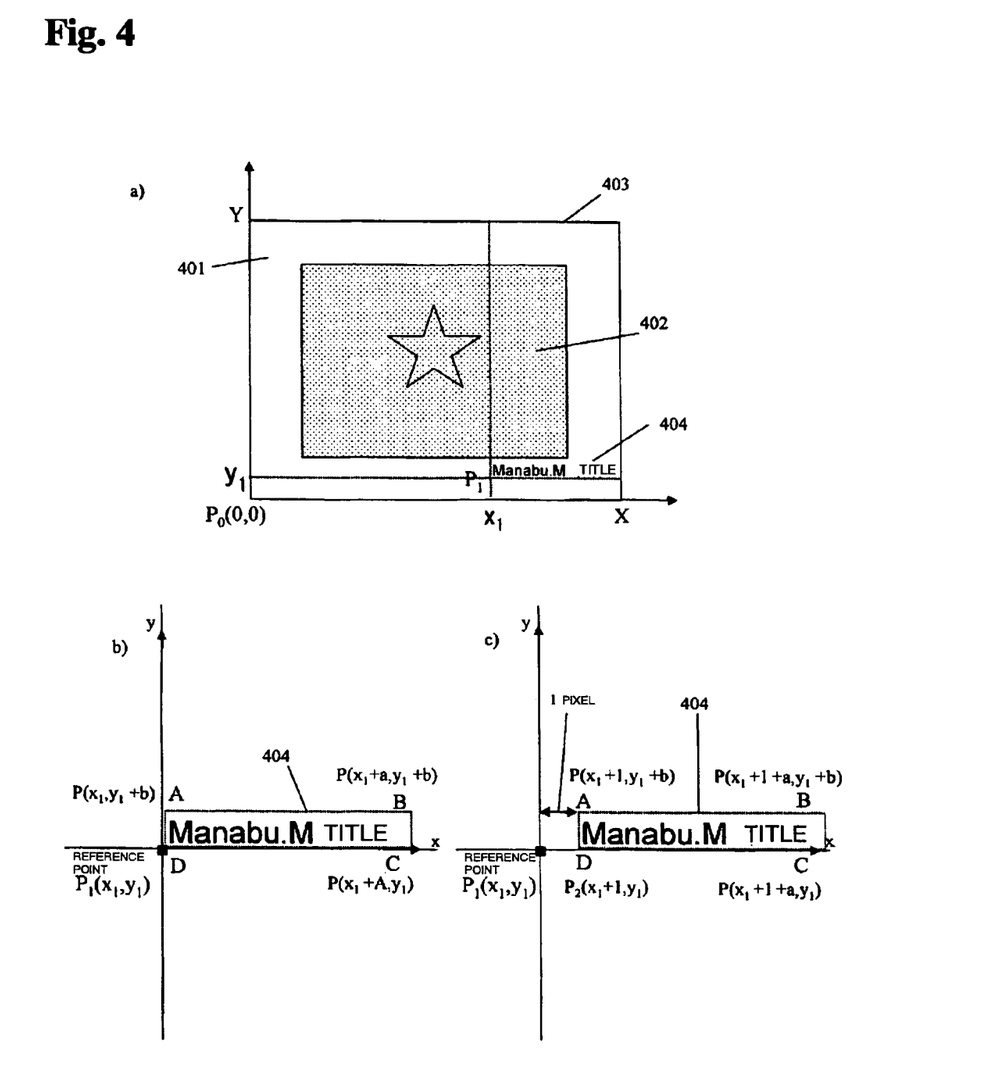
FIGS. 4A to 4C are explanatory diagrams showing a method of moving an identified original data insetting position according to an exemplary embodiment.

Subsequently, a description will be given of an example of calculating the identified original data insetting position with reference to FIGS. 4A, 4B, and 4C. Image data 403 (latitudinal: X pixel, longitudinal: Y pixel) obtained by pasting white data 401 in the periphery of the original data 402 is allocated to x-y orthogonal coordinates by a pixel unit as shown in FIG. 4A. A square ABCD indicated by a dotted line is an identified original data insetting area 404 (latitudinal: a pixel (a<X), longitudinal: b pixel (b<Y)), and a vertex D is a representative point indicative of the position of an insetting area 404. P1 (x1, y1) is a reference point to which the insetting area 404 is pasted, that is, a reference point to which the identified original data is inset.

A first digital image is created such that, as shown in FIG. 4B, the insetting area 404 is pasted to a position of the reference position P1 (x1, y1), that is, a position to be pasted so that the representative point (vertex D) coincides with the reference point P1 (x1, y1), and the identified original data is inset within the area 404. In this example, the signature data of the author (Manabu. M in the drawing) and original title data (title in the drawing) are identified original data.

A second digital image is copied such that as shown in FIG. 4C, the identified original data is inset into the insetting area 404 of P2 (x1+1, y1) obtained by moving the representative point in a positive direction of the x axis in parallel by one pixel. Likewise, a third digital image and subsequent digital images are copied by moving the representative point in parallel pixel by pixel. The above method makes it possible to copy (X-x1-a) digital images. Also, the moving direction and the amount of movement are associated with the identified image information, thereby making it possible to identify the version, the print, the user, and the purchaser of the copied digital image.

For example but not by way of limitation, a case in which the digital image is copied by 100 copies of a first version and 50 copies of a second version will be described with reference to FIGS. 4A to 4C. The y coordinate of the representative point that has been moved from the reference point in the y axial direction is associated with the version number, the x coordinate of the representative point that has been moved from the reference point in the x axial direction is associated with the copy order, and the amount of movement of the representative point from the reference point in the x axial direction is associated with the user, respectively. That is, in the case of 100 copies of the first version, the y coordinate y1 of the representative point is associated with the first version, the x coordinates x1, x1+1, x1+2, . . . x1+99 are associated with the copy order, and the amounts of movements 0, +1, +2, . . . +99 of the representative point that has been moved in the x axial direction are associated with the users, respectively. In the case of 50 copies of the second version (not shown), the y coordinate y1+1 of a point (x1, y1+1) obtained by moving the representative point from the reference point in the positive direction of the y axis in parallel by one bit is associated with the second version, and the copy order and the user are associated with each other by moving the x coordinate of (x1, y1+1) in parallel in the same manner described in the case of 100 copies of the first version.

In FIGS. 4A to 4C, the representative point is moved in parallel in the positive direction of the x axis pixel by pixel. However, the moving direction and the amount of movement are not limited to FIGS. 4A to 4C, but may be appropriately set as would be understood by one of ordinary skill in the art. For example but not by way of limitation, the amount of movement is set to be equal to or lower than the print resolution or the recording resolution which is assumed in a printer or a recording device used for unauthorized copying or falsification, thereby making it possible to prevent unauthorized copying or falsification, because the identified information is not lost even if the distributed or delivered digital image is output by a printer, or if the digital image is copied to the low-resolution format.

Figure 5:
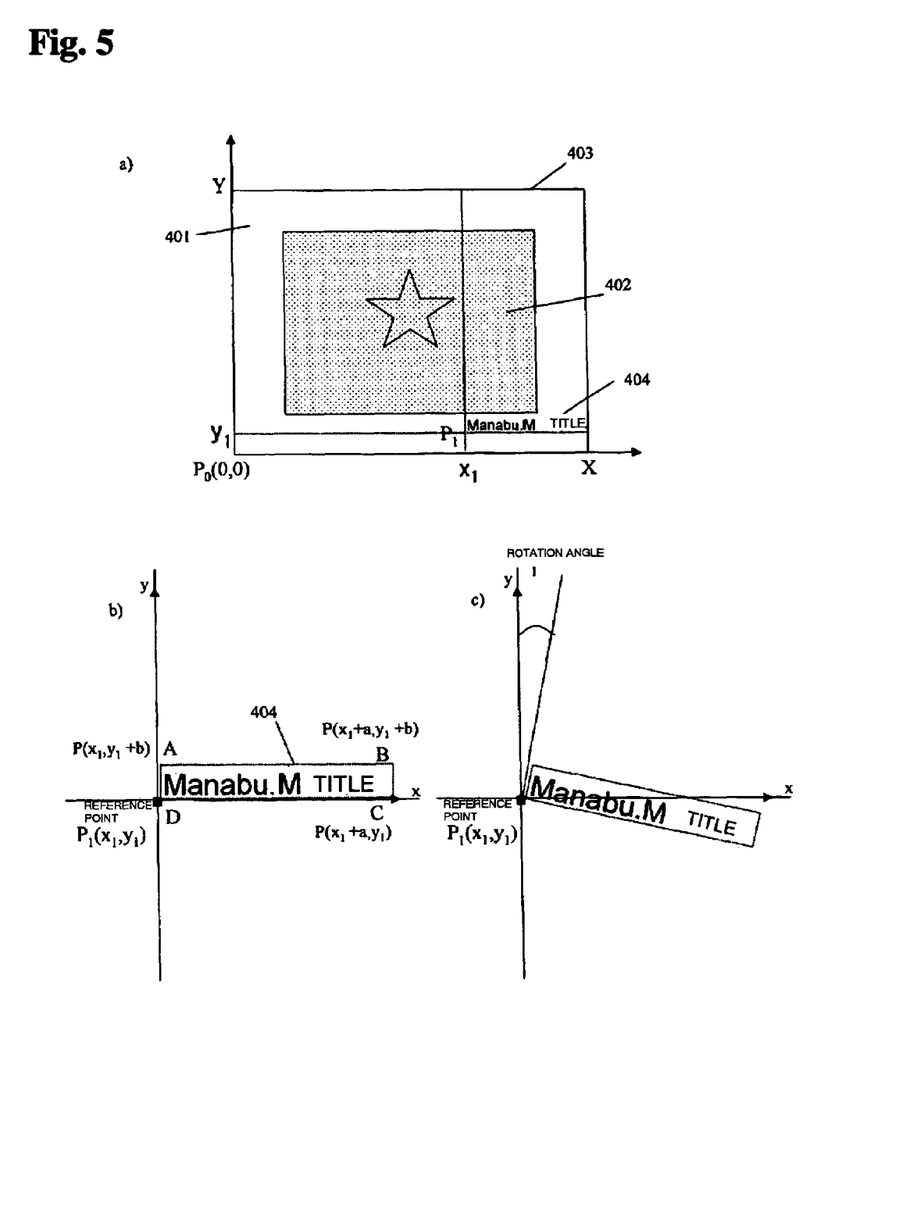
FIGS. 5A to 5C are explanatory diagrams showing a method of moving an identified original data insetting position according to an exemplary embodiment.

Next, a description will be given of an example of calculating the identified original data insetting angle with reference to FIGS. 5A to 5C. The first digital image is copied by making the representative point of the identified original data insetting area 404 coincide with the reference point P1 (x1, y1) as shown in FIG. 5B, in the substantially same manner described above with reference to FIGS. 4A and 4B. The second digital image is copied by rotating the identified original data insetting area 404 clockwise by 1 degree with centering around the reference point P1 as shown in FIG. 5C. Likewise, the identified original data insetting area 404 is rotated while the rotation angle is increased 1 degree by 1 degree to copy the third, fourth . . . n-th digital images. Also, as described with reference to FIGS. 4A to 4C, it is possible that the identified original data insetting area 404 is rotated while the rotation angle is increased 1 degree by 1 degree with centering around the point (x1, y1+1) obtained by moving the representative point from the reference point in the positive direction of the y axis in parallel by one bit. The position of the center point, the position/amount of movement of the representative point, the rotating direction, and the rotation angle are associated with the identified image information, thereby making it possible to identify the version, the copy, the user, and the purchaser of the copied digital image. An example in which the rotation angle and the amount of movement are associated with the identified image information is shown in FIGS. 6A and 6B.

Figure 6:
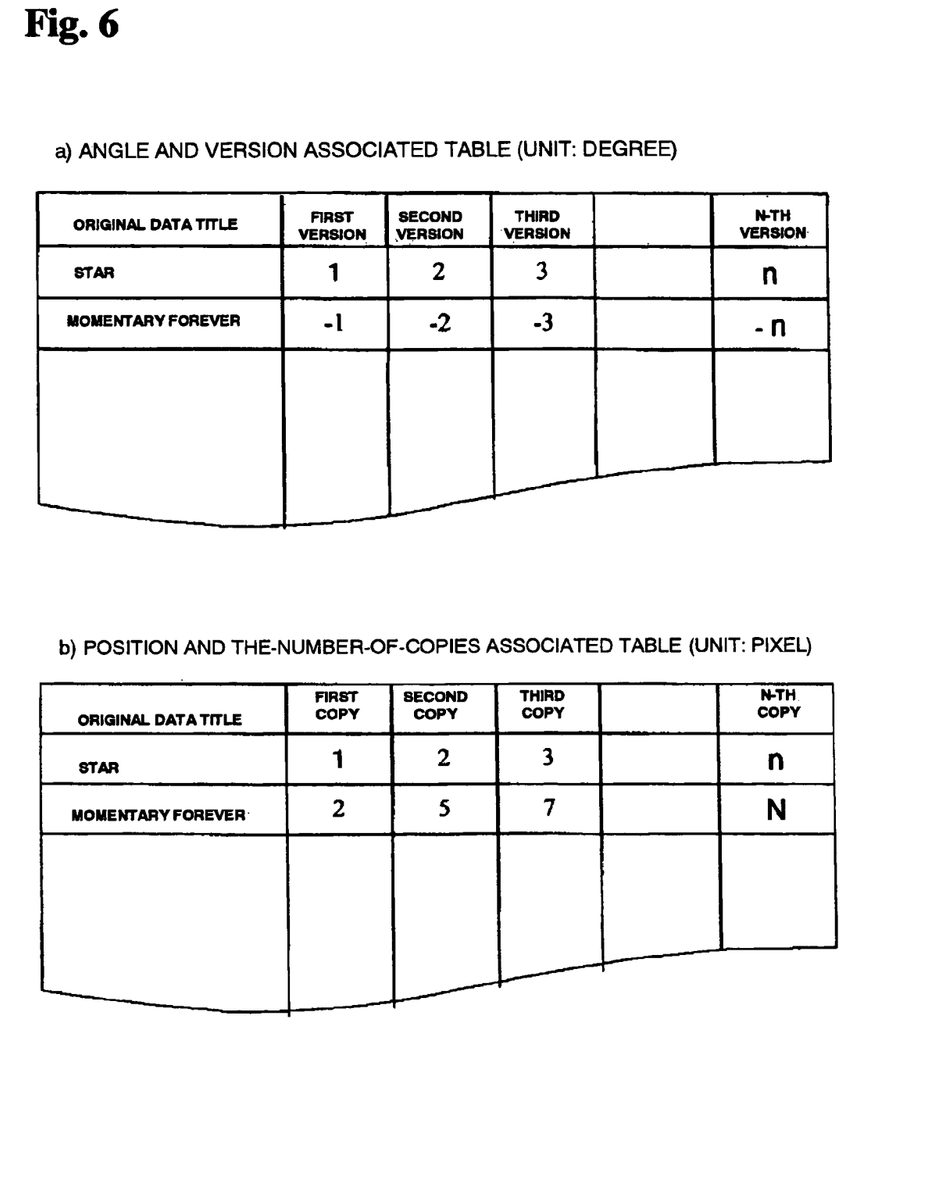
FIGS. 6A and 6B are diagrams showing an exemplary embodiment in which a rotation angle and an amount of movement are associated with identified image information.

The movement direction of the center point, the amount of movement, the rotating direction, and the amount of rotation of angle are not limited to FIGS. 6A and 6B, but may be set in any manner as understood by one of ordinary skill in the art. For example but not by way of limitation, the amount of rotation of angle is set to be equal to or lower than the print resolution or the recording resolution which is assumed in a printing device or an electronic data storing device used for unauthorized copying or falsification, thereby making it possible to prevent the unauthorized copying or falsification, because the identified information is not lost even if the distributed or delivered digital image is outputted by a printer, or if the digital image is copied to the low-resolution format.

Second Exemplary Embodiment

Figure 7:
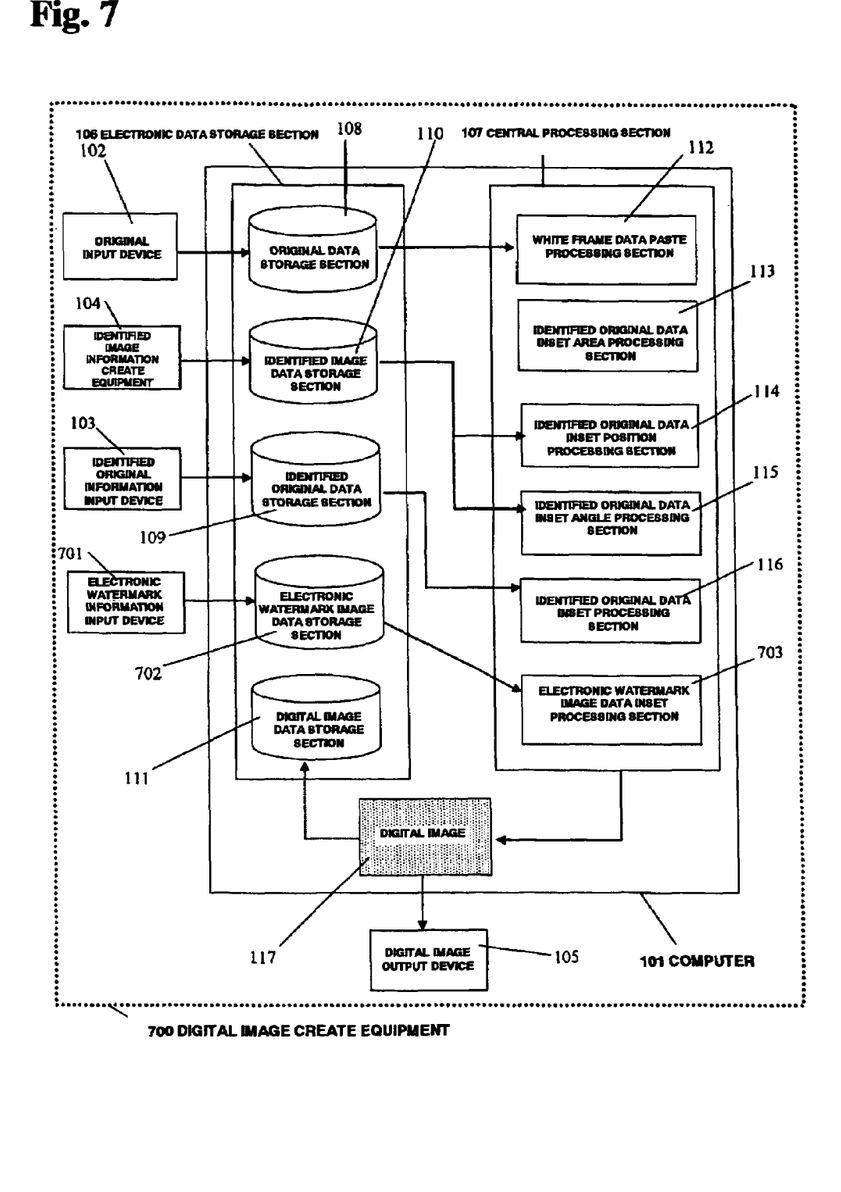
FIG. 7 is a block diagram showing another structural example of the digital image create equipment according to an exemplary embodiment.

FIG. 7 is a block structural diagram showing a main portion of another digital image create equipment 700 according an exemplary embodiment. The substantially same structural elements as those of FIG. 1 are denoted by identical reference numerals, and their further description will be omitted. In this example, only the structures different from those of FIG. 1 will be described.

FIG. 7 discloses a digital watermark information input device 701, a digital watermark image data storage section 702 added to an electronic data storage section 106, and a digital watermark image data insetting processing section 703 added to a central processing section 107. As the digital watermark information input device 701, a known image processing device can be used. Also, as the digital watermark image data insetting method, there can be applied the known digital watermark image processing method as disclosed in JP 11-41453 A. However, the present invention is not limited thereto.

The digital watermark image data of the ID code of the author or owner of the original, or the ID code of the user or purchaser of the digital image is created by the digital watermark information input device 701, and is stored in the digital watermark image data storage section 702. The digital watermark image data read signal and the digital watermark image data insetting position setting signal are input to the computer 101 from an input unit (not shown). Then, the digital watermark image data is read from the digital watermark image data storage section 702 based on the digital watermark image data read signal, and input to the digital watermark image data insetting processing section 703. In the digital watermark image data insetting processing section 703, the digital watermark image data inset area within or in the periphery of the identified original data inset area 402 is arithmetically processed, and the digital watermark image data is inset at a position designated by the digital watermark image data inset position setting signal.

Third Exemplary Embodiment

An example of creating a digital image recording medium according to the exemplary embodiment will be described. The digital image described with reference to FIGS. 4A to 4C, or 5A to 5C is created and then stored in the digital image distribution data storage section 111 by using the digital image create equipment 100 or 700. Then, desired digital image data is read from the digital image distribution data storage section 111, and then recorded in an electronic data recording medium such as an optical disk, a magnetic disk, a magnetic tape, or a semiconductor memory by using an electronic data recording device such as a DVD recording device, a CD recording device, or a magnetic disk recording device (but not limited thereto), thereby making it possible to readily create the digital image recording medium.

Fourth Exemplary Embodiment

Figure 8:
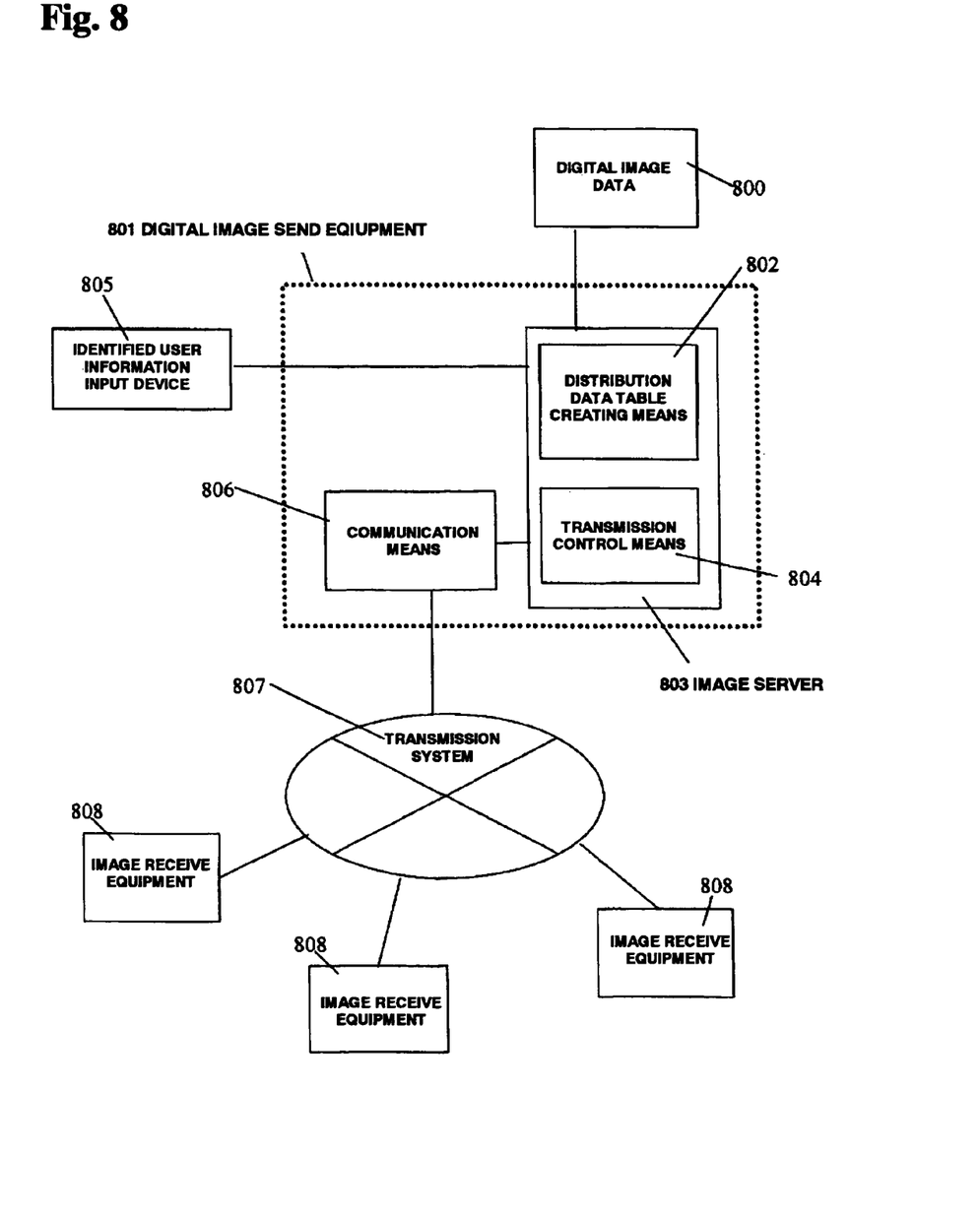
FIG. 8 is a block diagram showing one structural example of a digital image send equipment according to an exemplary embodiment.

FIG. 8 is a block structural diagram showing one structural example of a digital image send equipment according to an exemplary embodiment. A digital image send equipment 801 includes a distribution data table creating unit 802, an image server 803 having a transmission control unit 804 that controls the transmission of the digital image data 800, a communication unit 806 that transmits the digital image data 800 through a transmission system 807 such as the Internet, a satellite communication network, a telephone line network, a digital TV broadcast network, or a LAN, and the like (but not limited thereto). Then, a description will be given of an example of a method of transmitting the digital image data 800 to be transmitted according to a request from the user by means of the digital image send equipment 801.

Figure 9:
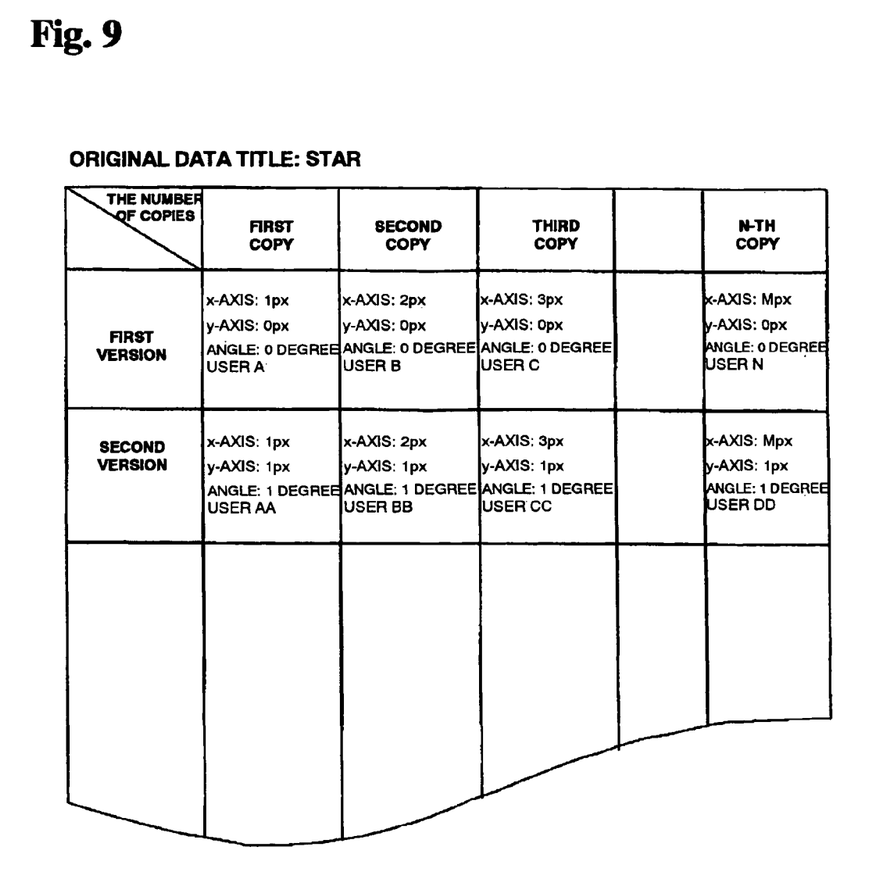
FIG. 9 is a diagram showing an example of a distribution data table according to an exemplary embodiment.

The digital image data 800 is created by the digital image create equipment 100 (refer to FIG. 1) or 700 (refer to FIG. 7). Distribution data that associates the identified original information inset position that is given to the digital image data 800 with the identified user information that is inputted from the identified user information input device 805 is created by the distribution data creating unit 802. Upon completion of the creation of the distribution data, the digital image data 800 is sent to the communication unit 806 from the image server 803, and then transmitted to the digital image receive equipment 808 of the user, for example but not by way of limitation, a personal computer, through the transmission system 807. Those successive operation controls are conducted by the transmission control means 804. An example of the distribution data table that has been created by the distribution data creating unit 802 is shown in FIG. 9.

The distribution data storing unit for storing the distribution data created by the distribution data creating unit 802 may be disposed within the digital image send equipment 801. Also, the identified user information may be read from the identified user data storage section that is disposed in the digital image create equipment 100 described with reference to FIG. 1.

Fifth Exemplary Embodiment

Figure 10:
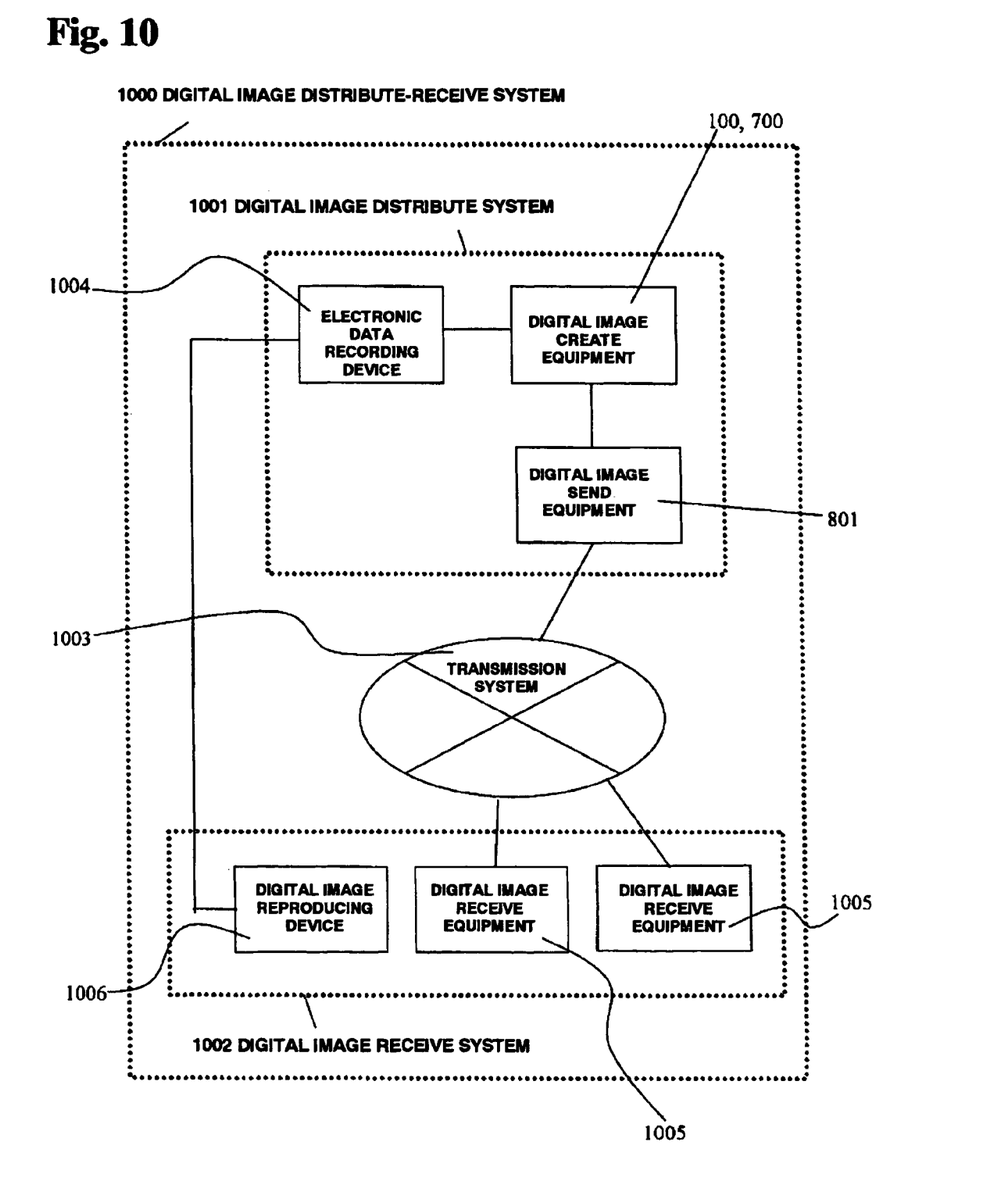
FIG. 10 is a block diagram showing one structural example of a digital image distribute-receive system according to an exemplary embodiment.

FIG. 10 is a block structural diagram showing one structural example of a digital image distribute-receive system according to an exemplary embodiment. A digital image distribute-receive system 1000 is structured such that a digital image distribute system 1001 and a digital image receive system 1002 are commonly coupled through a transmission system 1003, and the digital image data that is transmitted from the digital image distribute-receive system 1000 can be received by the digital image receive system 1002.

The digital image distribute system 1001 includes the digital image create equipment 100 (refer to FIG. 1) or 700 (refer to FIG. 2), the digital image send equipment 801 (refer to FIG. 8), an electronic data recording device 1004, and the like, but not limited thereto. The digital image receive system 1002 includes a digital image receive equipment 1005 such as a personal computer, a display device, a digital image storage device, an electronic data recording device, or a digital printing device which is possessed by the user, a digital image reproducing device 1006 such as a DVD reproducing device or a CD reproducing device, and the like, but not limited thereto.

The digital image receive equipment 1005 may have an image signal separating unit for separating an original signal and an identified original information signal from the image signal of the digital image. With the above structure, an image having no identified original information can be displayed or printed in a display device or a digital printing device.

The digital image distribute-receive system includes a system in which the digital image recording medium that has been created by the electronic data recording device 1004 is sold and the user purchases the digital image recording medium to distribute or receive the digital image information.

Specific Example 1

A computer (hard disk memory capacity: 140 GB, OS: Windows (registered trademark)) structured as shown in FIG. 1 was prepared. Original data (latitudinal: 1400 pixels, longitudinal: 700 pixels) of a photograph taken by a photographer with a digital camera and signature data obtained by reading a handwritten signature written on a paper by the cameraperson with a digital scanner were input to the computer by data transfer unit such as USB connection or a memory stick, and then stored in a hard disk (electronic data storage section). Also, the title data of the photograph created by word processing software was stored in the hard disk. Then, through the following method, identified original data consisting of the signature data and the title data was inset into the original data to copy 100 digital images as a first version.

Using the same method described in FIGS. 4A to 4C, the white frame of 150 pixels in width was pasted to the periphery of the original data to create the image data of the format A on x-y orthogonal coordinates. The sizes of the obtained image data with the white frame are 1700 pixels (x=1700) in latitude and 1000 pixels (y=1000) in longitude. Then, the sizes of the identified original data inset area were set to 400 pixels (x=400) in latitude and 100 pixels (y=100) in longitude. Also, the reference point P1 of the identified original data inset reference position was set to (1200, 25). Then, through the substantially same method as shown in FIGS. 5A to 5C, the representative point of the identified original data inset area was made to coincide with the reference point P1, and the identified original data inset area was inclined clockwise by about 1 degree with rotationally centering around the representative point. Thereafter, the identified original data was inset in the identified original data inset area to form a first copy of first version digital image.

The digital images subsequent to the first version and the first copy were copied by moving the representative point in the positive direction of the x axis pixel by pixel in a state where the identified original data inset area was kept inclined by 1 degree through the method described with reference to FIG. 4C. Thus, the representative point was moved up to (1299, 25) to copy 100 digital images, and those digital images were stored in the hard disk (digital image storage section). Then, the rotation angles were associated with the version numbers, the x coordinate of the representative point was associated with the print order, and the amount of movement of the representative point was associated with the user, respectively. The image processing such as the movement and rotation of the identified original data inset area and the insetting of the identified original data was conducted by using image processing software (trade name: "Photoshop") made by Adobe Systems Inc.

Specific Example 2

The 100 digital image data created in specific example 1 was sequentially read from the hard disk, and sequentially recorded on 100 CD recording mediums by a CD creating device to create 100 digital image recording mediums as the first version.

Specific Example 3

The 100 digital image data created in the specific example 1 was sequentially read from the hard disk, and was sequentially stored in the digital image storage section of the digital image distribution system shown in FIG. 8. Then, the 100 digital images were read from the digital image storage section in response to purchase requests from 100 users, and were distributed to the respective users from the communication processing section through the Internet.

The exemplary digital image create equipment, the digital image recording medium, and the digital image distribute system are useful in creation, sale, and distribution of the digital image for the purpose of protecting copyright.

The foregoing embodiment and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A digital image create apparatus for insetting identified original information into an original to create a digital image, comprising:
   an identified original information insetting position moving unit configured to move the identified original information from a reference position to another position different from the reference position according to a rule so as to inset the identified original information when the digital image is generated;
   a digital image distribute apparatus that communicates said digital image through a transmission system; and
   a distribution data creating unit configured to create distribution data obtained by associating identified information of the user with an insetting position of the identified original information given to the digital image sent to the user; and
   a send control unit configured to send the digital image to a digital image receive equipment of the user.

2. The digital image create apparatus according to claim 1, wherein the identified original information insetting position moving unit includes a rotationally moving unit configured to rotationally move the identified original information from a reference angle to a different angle according to the rule.

3. The digital image create apparatus according to claim 1, wherein the identified original information insetting position moving unit includes a parallel moving unit configured to move the identified original information from the reference position in a parallel direction thereto.

4. The digital image create apparatus according to claim 3, wherein the identified original information insetting position moving unit includes a rotationally moving unit configured to rotationally move the identified original information from a reference angle to a different angle according to the rule.

5. The digital image create apparatus according to claim 1, wherein an amount of movement of the insetting position of the identified original information is associated with identified image information that identifies the digital image.

6. The digital image create apparatus according to claim 5, wherein the identified image information includes identified user information that identifies a user of the digital image.

7. The digital image create apparatus according to claim 1, wherein the identified original information includes at least one of a signature handwritten by an author of the original and a signature handwritten by an owner of the original.

8. The digital image create apparatus according to claim 7, wherein the identified original information is inset in a portion outside an image area of the digital image.

9. The digital image create apparatus according to claim 7, further comprising a digital watermark image insetting unit that insets a digital watermark image in one of an area of the identified original information and a periphery of the area.

10. The digital image create apparatus of claim 1, wherein said digital image generated by the digital image create apparatus is recorded in an electronic data recording medium.

11. The digital image create apparatus according to claim 1, further comprising a digital image receive apparatus that receives a digital image through a transmission system.

12. The digital image create apparatus of claim 11, said digital image receive apparatus further comprising an image signal separating unit configured to separate an original signal and an identified original information signal from an image signal of the digital image.

13. A method of insetting original identification information into a digital copy of an original, comprising:
   inputting an original data read signal, an identified original data read signal, an identified original data inset reference position setting signal, and an identified image data read signal into a processor;
   inputting desired original data selected from an original data storage section based on the original data read signal into said processor;
   selecting an insetting format and inputting an identified original data insetting format select signal to said processor;
   if said selected insetting format is a framing format, pasting frame data in a periphery of said original data;
   reading the identified original data from the identified original data storage section based on the identified original data read signal, and inputting to the identified original data inset area processing section;
   calculating the identified original data inset area based on the size and configuration of the inputted identified original data;
   inputting the original data to an identified original data insetting position processing section, and calculating a movement direction and a movement amount for a reference position set based on the identified original data insetting reference position setting signal, and the identified image data read from the identified image data storage section in response to the identified image data read signal;
   inputting the identified original data and the output data from the identified original data insetting position processing section to the identified original data insetting processing section; and
   insetting the identified original data in the identified original data insetting area.

14. A computer readable medium configured to store a set of instructions for insetting original identification information into a digital copy of an original, said instructions comprising:
   inputting an original data read signal, an identified original data read signal, an identified original data inset reference position setting signal, and an identified image data read signal into a processor;

inputting desired original data selected from an original data storage section based on the original data read signal into said processor;

selecting an insetting format and inputting an identified original data insetting format select signal to said processor;

if said selected insetting format is a framing format, pasting frame data in a periphery of said original data;

reading the identified original data from the identified original data storage section based on the identified original data read signal, and inputting to the identified original data inset area processing section;

calculating the identified original data inset area based on the size and configuration of the inputted identified original data;

inputting the original data to an identified original data insetting position processing section, and calculating a movement direction and a movement amount for a reference position set based on the identified original data insetting reference position setting signal, and the identified image data read from the identified image data storage section in response to the identified image data read signal;

inputting the identified original data and the output data from the identified original data insetting position processing section to the identified original data insetting processing section; and insetting the identified original data in the identified original data insetting area.

* * * * *